Feb. 24, 1959 W. P. DAPSES 2,874,484
APPARATUS FOR THERMALLY TREATING ARTICLES
Filed Nov. 9, 1956 2 Sheets-Sheet 2
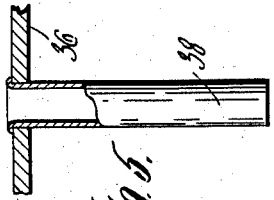
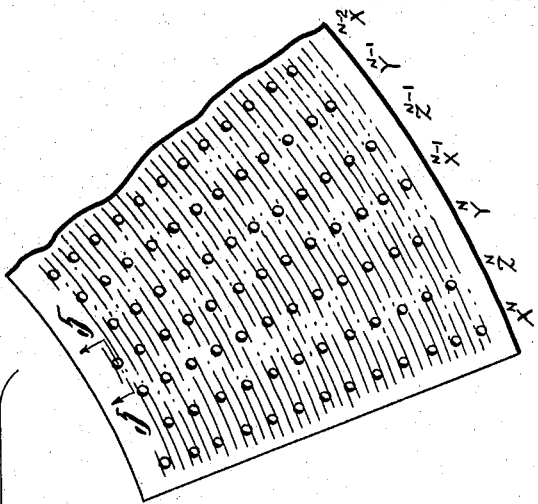
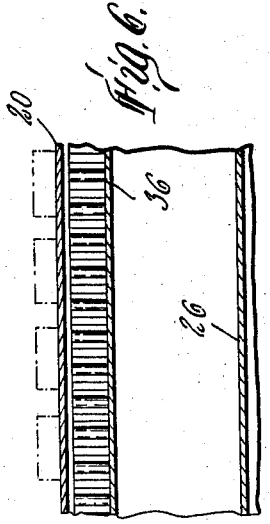
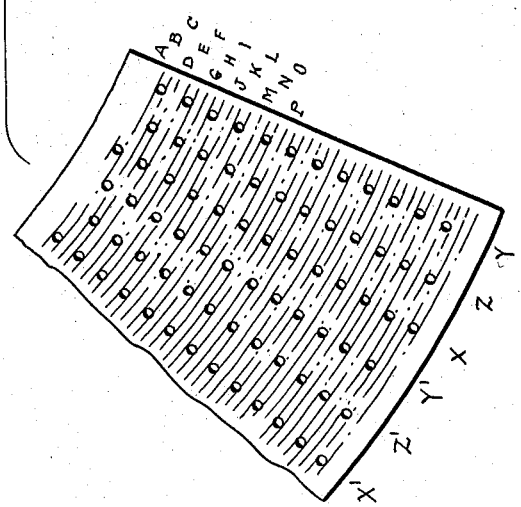

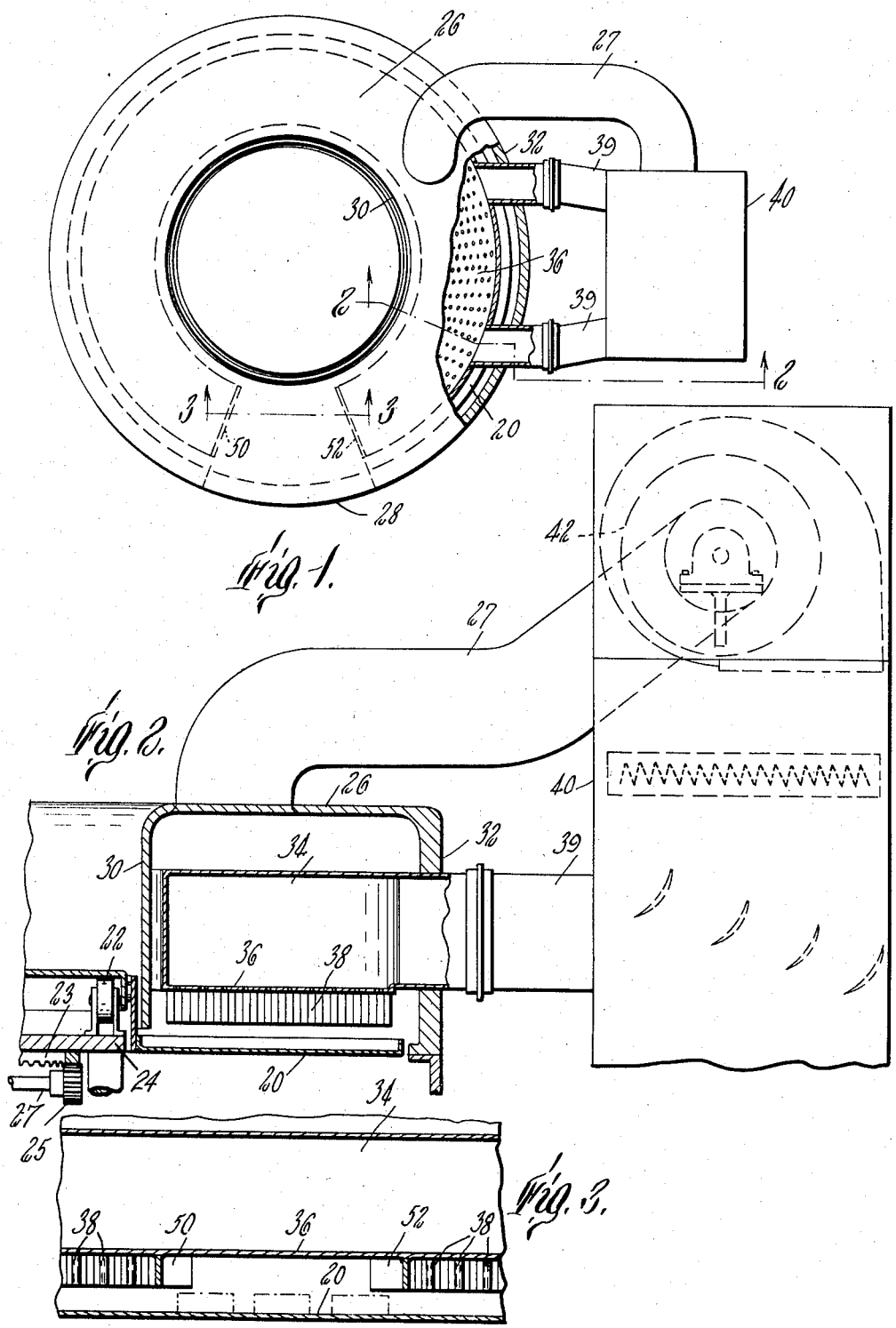

United States Patent Office

2,874,484
Patented Feb. 24, 1959

2,874,484

APPARATUS FOR THERMALLY TREATING ARTICLES

William P. Dapses, North Attleboro, Mass., assignor to Wolverine Equipment Co., Cambridge, Mass., a corporation of Massachusetts Application November 9, 1956, Serial No. 621,355

4 Claims. (Cl. 34—187)

This invention relates to conditioning apparatus and in particular to apparatus for thermally treating articles, either by way of heating or cooling, with gaseous fluids, specifically air.

The temperature conditioning treatment of many materials has to be precise. For example, certain resinous materials have very exact curing temperature-time curves. When such materials are to be processed on a large scale, as in continuous production machinery, efficient production rates necessitate the simultaneous cure of fairly large areas of the material either in a single mass or in separate masses. Where space requirements permit wholly linear travel of the articles during treatment, it has been possible to create tunnels wherein heat is imparted to or withdrawn from the articles uniformly throughout the transverse overall dimension of the paths of travel of the articles, as on a belt conveyor, since all the articles advance in parallel paths at a uniform rate.

Space, operator positioning or other requirements, however, often tend to make non-linear travel desirable as by providing 90°, 180° or other angular turns in the path of travel. In such cases, the rate of advance of articles around the turns varies depending upon the radius of the path of each article. Articles at the minimum radius thus tend to be exposed over the same period of time to more intense treatment due to their slow advance and the treatment is less intense progressively outwardly of the curvilinear path with the consequence that uniformity of treatment is lost by reason of the departure from linear travel.

It is thus the primary object of this invention to provide a temperature treatment apparatus in which a conveyor advances along a curvilinear path, and preferably a circular path, and wherein articles on the conveyor are subjected to uniform thermal treatment imparted by a forced air circulation regardless of their transverse position on the conveyor.

In forced air ovens according to this invention, for example, each article being treated, during its travel through the oven, absorbs heat transferred from substantially the same number of pounds of circulating conditioning gaseous medium regardless of the radius of the arc along which the article or any portion thereof travels and despite the unequal travel at different radii.

The invention will be more fully understood when taken in connection with a more detailed description thereof which will be given with reference to the accompanying drawings.

Fig. 1 is a plan view, partly in cross-section, of apparatus embodying the invention;

Fig. 2 is an enlarged cross-sectional detail taken along the lines 2—2 of Fig. 1;

Fig. 3 is an enlarged cross-sectional detail taken along the line 3—3 of Fig. 1;

Fig. 4 is a fragmentary detail of the lay-out of the jets in repeating pattern; and Fig. 5 is an enlarged cross-sectional detail taken along the lines 5—5 of Fig. 4; and Fig. 6 is a detail of a modified form of device.

As shown in Figs. 1 and 2, the oven comprises a generally circular apparatus provided with a conveyor in the form of a rotating turntable having an annular article receiving trough 20. The turntable is supported on circumferentially spaced bearing wheels one of which is shown in Fig. 2 at 22. The wheels 22 are mounted in brackets on top of a fixed platform or frame 24 and the turntable may be rotated by a suitable drive means such as ring gear 23, driven by gear 25 on shaft 27 (Fig. 2).

For the major portion of its extent, the annular trough 20 is surmounted by a hood 26 of inverted U-shaped cross-section which covers the path of travel of the rotating turntable, except at a loading station 28 provided at the front of the apparatus. The hood 26 is provided with downwardly extending inner wall 30 and outer wall 32.

Within the hood and supported over the turntable trough 20 is a sealed annular plenum chamber 34 which has a bottom plate 36 apertured throughout most of the chamber, omitting only the loading station 28 at the front of the appratus, as shown in Fig. 3. Each aperture carries a downwardly extending nozzle 38, as shown in Fig. 5, extending to a uniform distance above the plane of the annular trough 20. The nozzle orifices are uniform in size and shape, being preferably circular in cross-section.

The plenum chamber 34 is connected through suitable inlet conduits 39 at one side of the apparatus with a heating chamber 40 and the outlet side of a circulating fan 42. The suction side of the fan is connected to the top of the hood 26 by a conduit 27 so that air may be circulated through the nozzles 38 and around and out of the hood back to the suction side of the fan.

Fig. 4 illustrates fragments of a pattern of the orifices of the nozzles 38 extending throughout the arc of treatment which will secure the application of a uniform weight of air on every article placed on the turntable 20 at the loading station 28 during its passage in one revolution back to the loading station 28 (which can also act as an unloading station), despite the fact that articles on the outside of the trough will travel a much greater distance during one revolution of the turntable than those on the inside of the trough. As indicated in Fig. 1, the arc of treatment begins at one side of the loading station just beyond an inwardly extending baffle 50 (assuming clockwise rotation of the turntable) and terminates at the right as the articles emerge from beneath an opposed baffle 52.

First, in order that certain points on the turntable will pass directly beneath the center of the same number of jets, the orifices are placed in circumferential rows along a series of concentric abutting arcuate sectors, all of the sectors having a radial width equal to the maximum radial width of the orifices. All the circumferential rows contain an identical number of orifices at regularly spaced, but staggered degree, intervals through the arc of treatment. Thus the innermost circumferential row of orifices lies in an arcuate sector A (Fig. 4) and each succeeding circumferential row of orifices progressively outwardly of the plate 36 lies in an abutting arcuate sector of progressively increasing radius, B, C, D, etc.

Moreover, in the embodiment shown Fig. 4 every third arcuate sector contains orifices lying in radial alignment. Thus, for the innermost circumferential row A, and every third sector, there are radial rows of orifices on the series of radii $X, X' \ldots X^{N-2}, X^{N-1}, X^N$, with all these orifices lying in the same group of sectors A, D, G, J, M, P, etc.

Between this group of X radii, the orifices are arranged in staggered relation such that they lie in radial rows evenly spaced between the X series of radii $X, X' \ldots$ $X^{N-2}$, $X^{N-1}$, $X^N$ but in alternating groups of sectors. Thus the arcuate sectors B, E, H, K, etc. contain orifices lying on the series of radii Y, Y' ... $Y^{N-1}$, $Y^N$ whereas the arcuate sectors C, F, I, etc. contain orifices lying on the series of radii Z, Z' ... $Z^{N-1}$, $Z^N$, etc.

The orifices thus assume a repeat pattern, constituted of groups of radial rows X, Y, Z. In order to have an equal number $n$ of each group of rows X, Y and X, the pattern starts with a row Y and terminates with a row $X^N$.

In this fashion, each point on the turntable will be exposed, during its passage through the arc of treatment, to an equal weight of air discharged through the nozzles, it beign assumed that the amount of air discharged from each nozzle is the same in a given period of time.

It has been found that articles processed in such an apparatus will receive, in the case of resins, an equivalent cure no matter on which portion of the trough 20 they are placed.

Thus if the materials incorporate a resin such as a vinyl plastisol which has a very precise curing temperature, for example, 50 seconds at 500° F., a uniform cure has been obtained no matter whether the article goes through the apparatus near the inner portion of the trough or near the outer portion of the trough.

While the plate 36 has been shown as being located above the turntable 20 it should be understood that, if desired, the mechanism may be inverted so that the air blast is directed against the underside of either a perforate or imperforate turntable as shown in Fig. 6. It should be further understod that the apparatus may be provided with more than one loading station, for example, in diametrically opposed relation or at 90° or other spacing; and it should be further understood that the pattern of nozzles is not to be considered as limited to the precise geometric pattern shown in Fig. 3, so long as the arcs bounding the outer extent of the orifices in each circumferential row bound the inner extent of the orifices lying in the next outwardly circumferential row and the spaces between the radial rows are uniform. Thus, for example, it is possible to have the pattern repeat, beginning with every fourth, fifth or sixth radial row instead of every third radial row as shown in Fig. 3. In that case the spacing of the orifices in each radial row would be correspondingly greater. Further, cooling, rather than heating air or other gaseous medium may be circulated through the apparatus, the heating chamber being replaced by a refrigerating unit. Similarly, humidifying or dehumidifying treatments may be accomplished with or without temperature change, by substituting air-conditioning apparatus in the air circuit for the heating unit.

These and other modifications, such as will occur to those skilled in the art, are not excluded from the scope of the invention, which is to be regarded as limited only as defined in the appended claims.

I claim:
1. Apparatus for thermally treating articles moving along an arcuate path comprising a conveyor for supporting articles to be treated, means for moving said conveyor at a uniform rate along an arcuate path through a predetermined arc of treatment, a plurality of nozzles having orifices of uniform dimension which are small compared with both the width and length of said arcuate path disposed along said path for directing gaseous streams towards said conveyor as it passes through said arc, the apertures of said nozzles lying in a single plane spaced from and parallel to the path of said conveyor and lying in radial and circumferential rows, the circumferential rows lying in a series of abutting arcuate sectors of uniform radial width equal to the maximum radial width of the orifices, and each circumferential row containing an identical number of orifices at regularly spaced degree intervals along said arc but the orifices being staggered so that orifices in repeating spaced arcuate sectors lie on one series of radii while the orifices in intervening arcuate sectors lie on other radii spaced evenly between said one series of radii.

2. Apparatus as claimed in claim 1, including means for continuously force-flowing a gaseous medium at substantially uniform rates and temperatures through said nozzles and out of said orifices.

3. An article conditioning apparatus comprising a conveyor having an arcuate path of travel for supporting articles to be conditioned, a series of nozzles having orifices of uniform size and shape lying in a single plane in opposed parallel relation to said conveyor for directing a multitude of individual streams of air towards said conveyor as it advances through said path, said orifices lying in radial and circumferential rows along said path, the circumferential rows lying in a series of abutting arcuate sectors of uniform radial width equal to the maximum radial width of the orifices, and each circumferential row containing an identical number of orifices at regularly spaced degree intervals along said arc but the orifices being staggered so that orifices in repeating spaced arcuate sectors lie on one series of radii while the orifices in intervening arcuate sectors lie on other radii spaced evenly between said one series of radii.

4. Apparatus as claimed in claim 3 wherein the orifices in every third sector lie on one series of radii and the orifices in the intervening sectors lie on two different series of radii spaced evenly between said one series of radii.

References Cited in the file of this patent
UNITED STATES PATENTS

| | | |
|---|---|---|
| 620,139 | Hysore | Feb. 28, 1899 |
| 2,347,555 | Greene | Apr. 25, 1944 |
| 2,392,283 | Ferre | Jan. 1, 1946 |
| 2,420,739 | Dorsch | May 20, 1947 |

FOREIGN PATENTS

| | | |
|---|---|---|
| 506,260 | Great Britain | May 22, 1939 |